July 17, 1928.  1,677,658

J. W. SAFFOLD

CHAIN TOOL

Filed June 1, 1925

Inventor
James Webb Saffold
By
Chas. E. Billman Attorney

Patented July 17, 1928.

1,677,658

UNITED STATES PATENT OFFICE.

JAMES WEBB SAFFOLD, OF CLEVELAND, OHIO.

CHAIN TOOL.

Application filed June 1, 1925. Serial No. 34,060.

My invention relates to improvements in chain tools, the present embodiment of the invention being particularly designed and adapted for use as a portable tool in opening and detaching and closing and attaching the hook links used at the ends of cross chains in attaching and detaching the same to the side chains or members of ordinary anti-skid tire chains. This application is directed to similar subject matter as disclosed in companion applications Serial No. 90,782 filed February 26, 1926, and Serial No. 133,758 filed September 7, 1926.

The primary object of the invention is to provide a generally improved tool of the type or class mentioned, which will be exceedingly simple in construction, cheap of manufacture, and efficient in use.

A further and important object is the provision of anvil and plunger or clamp blocks having spaced grooves for receiving and holding the side or overlapping members of the hook links while opening or closing the hook ends thereof, one of said blocks being provided with a recess and wedge shaped horn adapted to hold the hook link and engage and open the hook portion thereof as the opposing block is being operated.

With the above mentioned and other ends in view, the invention consists in the novel construction, arrangement and combination of parts, illustrated in some of its embodiments in the accompanying drawings, and particularly pointed out in the appended claims.

Figure 1:
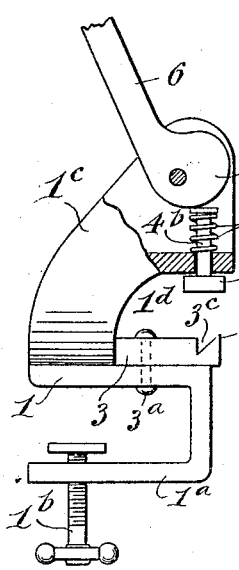

Referring to the drawings, forming a part of this specification, Figure 1 is a side elevation of a chain tool, constructed in accordance with this invention.

Figure 2:
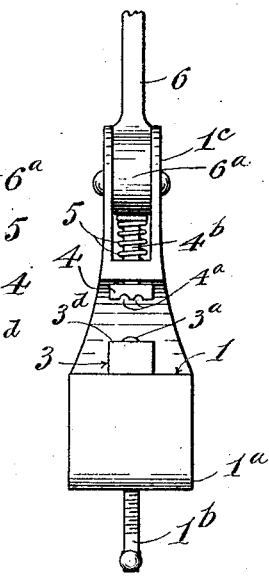

Fig. 2, a front elevation of the same.

Figure 3:
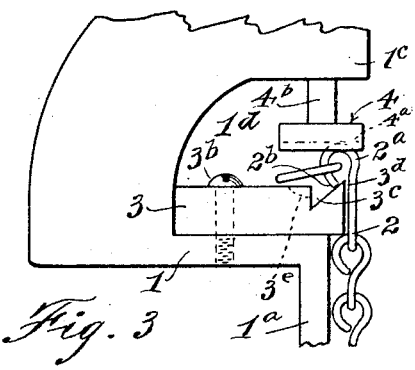

Fig. 3, an enlarged fragmentary side elevation of the same showing the anvil and plunger block in engagement with a hook link in engaging and opening the hook portion of such hook link.

Figure 4:
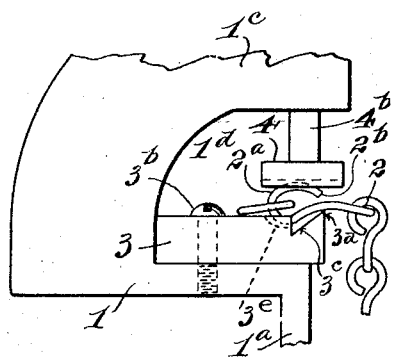

Fig. 4, a similar view of the same illustrating the manner in which the hook link is held in closing the hook end thereof in connection with one of the side chains.

Figure 5:
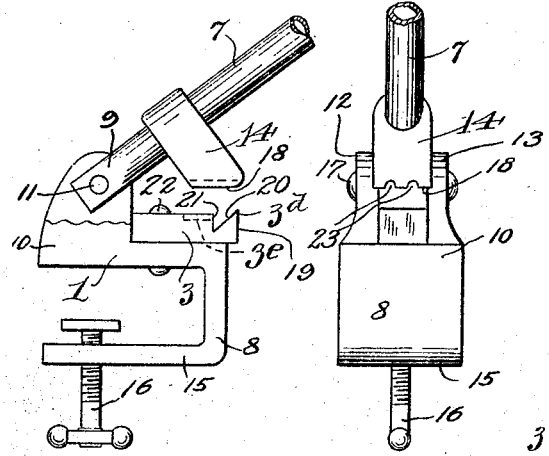

Fig. 5, a side elevation of a modified form of same.

Figure 6:
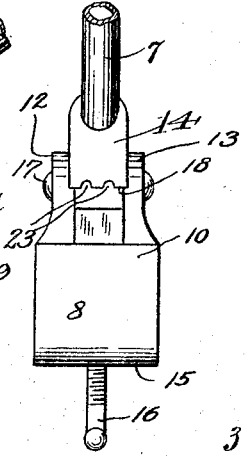

Fig. 6, a front elevation of the form shown in Fig. 5.

Figures 7, 8:
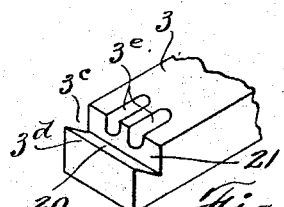

Fig. 7, a fragmentary perspective view of the relatively fixed or anvil block, detached.

Fig. 8, a perspective view of the relatively movable or plunger block used on the device of Fig. 1, detached.

Similar numerals of reference designate like parts throughout all the figures of the drawings.

The improved chain tool comprises a suitable support or jawed frame consisting, in the present instance, of a base or support 1, and a base clamp $1^a$, provided with a clamp screw $1^b$, for convenient attachment to a bench or board. The support or frame is provided with an overhanging arm $1^c$, which, in conjunction with the base 1, provides an article or link receiving recess $1^d$.

As a means of adapting the tool to the particular article or device with which it is adapted to be used, such for example,—as the hook link 2, with which it is to be operated, the base is provided with an anvil block 3, suitably mounted and secured by means of a suitable fastening element, such for example,—as a fastening element in the specific form of a rivet $3^a$, or screw $3^b$, as shown, and the anvil block 3 is provided with a recess $3^c$, terminating in a horn $3^d$, the latter being preferably of wedge-shape formation and extending upwardly, as will appear most clearly in Fig. 7 of the drawings.

The upper face portion of the anvil block 3 at the rear of the recess $3^c$ is provided with a pair of spaced parallel extending grooves $3^e$, for receiving and holding the overlapping or side members $2^a$, of the hook link when it is desired to hold the latter in position when closing the hook ends $2^b$, as shown in Fig. 4 of the drawings.

As a means of providing companion or cooperating elements for receiving and holding such side members of the hook link in position, the relatively movable or plunger block 4, is provided on its base or underside with a pair of grooves $4^a$, these grooves receiving such side members $2^a$ either when the hook link is in a position to be closed, as shown in Fig. 4 of the drawings, or is in a position to have its hook ends opened by the horn portion of the anvil block, as shown in Fig. 3 of the drawings.

In the form shown in Figs. 1 to 4, inclusive, of the drawings, the relatively movable or plunger block 4 is provided with a plunger stem $4^b$, operating in a suitable opening in the overhanging arm $1^c$ and being adapted to be returned to its elevated or retracted position by means of a coiled spring 5, surrounding the stem portion 4$^b$, one end of said stem 4$^b$ being adapted to be frictionally engaged by means of a cam head 6$^a$, of an operating lever 6.

The embodiment of my invention illustrated in Figs. 5 and 6 exemplifies a simpler mechanism, which, however, is adapted generally to carry out the object of my invention in a manner similar to that of the embodiment previously described.

In the present embodiment, a C-clamp 8 is provided having a pair of parallel horizontal arms 10 and 15 joined by an intermediate vertical connecting portion, the arms 10 and 15 comprising a base for supporting an anvil 3 and a base clamp element respectively. A clamp screw 16 is projected through the base clamp 15 and is adapted to engage a bench or board interposed between the upper enlarged end of the clamp screw and the end surfaces of the base 10.

In the following description, I shall term the portions of the device shown at the right in the drawing as the forward end of the device, and the portions shown to the rear as the rearward portions, since when the bench board is interposed within the C-clamp, the operator facing the bench would so regard the portions designated as forward and rearward portions respectively.

Projecting upwardly from the base 10, I provide a pair of spaced lugs 12 and 13 adapted to receive between them an end of a lever 7 which may be, as illustrated, of tubular form, flattened at the end 9, which is illustrated as inserted between the lugs 12 and 13, the flattened end being perforated at 11. The lugs 12 and 13 are transversely bored to admit a hinge pin 17 projected through the bores of the lugs and the perforations 11 of the interposed flattened end 9 of the lever 7. The lever 7 is thus adapted for swivelling in a vertical plane, assuming the bench board to be horizontal, by the operator grasping the free handle end of the lever 7.

Forwardly of the companion lugs 12 and 13, which form an operating head for the device, a flat anvil-supporting surface is provided to support the anvil block 3, suitably mounted thereon and secured thereto by a rivet 22 which is projected through aligned apertures of the anvil block 3 and base 10. The anvil block is preferably of the form illustrated in Fig. 7, being provided with a groove 3$^c$ extending transversely from side to side of the anvil to provide an upwardly extending horn 3$^d$ at the forward end of the anvil, the same being preferably of wedge-shaped formation with its most forward surface 19 extending substantially vertically and its rear surface 20 being downwardly rearwardly inclined to meet an opposing substantially vertical surface 21 of the groove 3$^c$.

The upper face portion of the anvil block 3 is provided with a pair of spaced parallel grooves 3$^e$, Figs. 5 and 7, extending longitudinally of the block 3, rearwardly from the recess 3$^c$ these being preferably disposed and formed as best illustrated in Fig. 7, and indicated in Fig. 5.

Carried on the lever 7 and rigidly affixed thereto, at a point spaced from the companion head lugs 12 and 13, I provide a plunger block 14 comprising a movable jaw cooperating with the anvil block 3, the plunger block being preferably bored at its one end to permit it to be telescoped over the lever-tube 7, and terminating at its other end in a jaw face 18 adapted, when the lever 7 is moved downwardly to the position substantially as illustrated in Fig. 5, to be disposed approximately horizontally. The jaw face 18 is provided with a pair of longitudinally extending grooves 23 corresponding to the grooves 3$^e$. The grooves 23 extend from front to rear when the jaw is in operating position, as illustrated in Fig. 5, and are disposed preferably exactly above the cooperative grooves 3$^e$ on the upper surface of the anvil block.

In operating upon a chain, to close the companion eyes of an automobile non-skid chain, for instance, the chain is placed with the eye portions resting within the anvil grooves 3$^e$ and the movable jaw element 14 is then brought downwardly with the longitudinally extending grooves 23 thereof engaging the companion eye of the chain, to compress the eye to close it, the eyes being prevented from lateral movement by the lateral confining walls of the grooves and against longitudinal movement by the restraining effect of the surface 20 of the horn and the terminating rearwardly disposed end walls for the grooves 3$^e$.

When using the tool for opening the eyes of a chain link, the portions of the link eye adapted to be forced apart, are placed over the horn 3$^d$ and the plunger jaw element 14 is brought downwardly by operation of the handle 7 upon the then uppermost portion of the link and the eye is, therefore, spread open by its terminating ends being forced along the wedge surfaces 19 and 20 of the horn.

The chain tool illustrated in Figs. 5 to 7 inclusive, is adapted to operate upon a chain such as the chain 2, in the manner illustrated in Figs. 3 and 4 of the first embodiment of my invention described, as will be clearly understood from the foregoing description, both forms of the invention being adapted to perform the same functions upon a chain link, the first embodiment being preferably employed on heavier chains, and the second embodiment being less expensive to make and more adaptable for use on lighter chains.

Having thus described some of the embodiments of my invention, without having attempted to set forth all the forms in which it may be made, or all the modes of its use, what I claim and desire to secure by Letters Patent is,—

1. A chain tool for tire chain cross-links comprising a frame, said frame having joined base and head portions, said base adapted to be fixed to a support with a supporting surface upwardly disposed thereon, an anvil block supported on the upper surface of said base near an end of the base, said head projecting upwardly from the base from another portion of the base, a lever arm pivoted to the head to adapt it for swivelling in a plane in line with the said block, a jaw rigidly carried by the arm intermediate its ends and adapted to engage and compress an eye of a chain link supported on the anvil block, said jaw and anvil block having opposing jaw surfaces, said surfaces being correspondingly grooved to receive the side members of a tire chain link eye to hold the same against lateral movement when the eye is compressed by the movement of the jaw toward the anvil block, said grooves comprising a pair of substantially parallel longitudinal grooves extending in a direction toward the head supporting base portion, and a groove extending in a direction transverse to the said parallel grooves and disposed more remote from the head supporting base portion, said anvil comprising a wedge-shaped horn extending upwardly from the anvil block, disposed on the side of the transverse groove remote from the said parallel grooves.

2. In a chain tool for opening and closing the eyes of tire chain cross-links, a pair of relatively movable jaws having opposed jaw faces, the face of one of the jaws comprising a pair of parallel grooves and a third groove disposed at the ends of, communicating with, and disposed transversely of the said parallel grooves, and a wedge-shaped horn disposed parallel with the transversely disposed groove extending from the jaw toward the opposed face of the other jaw, said other jaw having a recessed portion adapted to receive a part of a chain cross-link, disposed between the jaws and having other portions projected into the said parallel grooves thereof.

3. A chain tool for tire chain cross links, comprising a frame having joined base and head portions, said base adapted to be fixed to a support with a supporting surface upwardly disposed thereon, an anvil block supported on the upper surface of said base near an end of the base, said head projecting upwardly from the base from another portion of the base, a pair of compression jaws, means to relatively reciprocate the jaws to compress an eye of a chain link disposed between them, said jaws having opposing jaw surfaces, said surfaces being correspondingly grooved to receive the side members of a tire chain link eye to hold the same against lateral movement when the eye is compressed by the movement of one of the jaws towards the anvil block, said grooves being parallel and extending in a direction toward the head supporting base portion, there being another groove extending in a direction transverse to the said parallel grooves and disposed more remote from the head supporting base portion, said anvil comprising a wedge-shaped horn extending upwardly from the anvil block, disposed on the side of the transverse groove remote from the said parallel grooves.

In testimony whereof I have affixed my signature.

JAMES WEBB SAFFOLD.